Figures 1, 2:
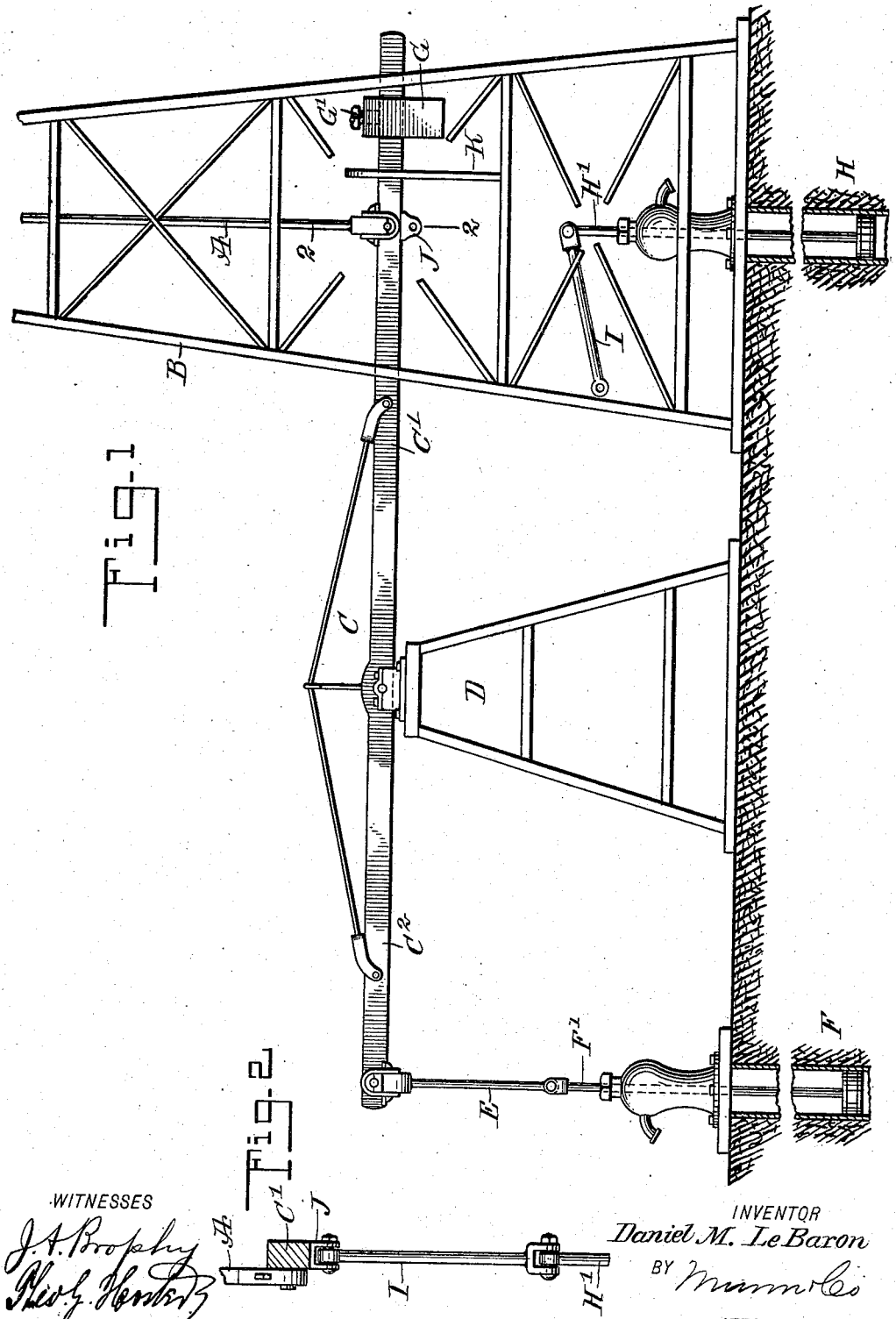

No. 867,060. PATENTED SEPT. 24, 1907.
D. M. LE BARON.
POWER TRANSMISSION.
APPLICATION FILED JULY 30, 1906.

WITNESSES
J. A. Brophy
Theo. G. Hertz

INVENTOR
Daniel M. Le Baron
BY
Munn & Co.
ATTORNEYS

UNITED STATES PATENT OFFICE.

DANIEL M. LE BARON, OF AMOS, NEVADA.

POWER TRANSMISSION.

No. 867,060.　　　　Specification of Letters Patent.　　　　Patented Sept. 24, 1907.

Application filed July 30, 1906. Serial No. 328,332.

*To all whom it may concern:*

Be it known that I, DANIEL M. LE BARON, a citizen of the United States, and a resident of Amos, in the county of Humboldt and State of Nevada, have invented a new and Improved Power Transmission, of which the following is a full, clear, and exact description.

The invention relates to wind motors, and its object is to provide a new and improved power transmission, more especially designed for use on wind mills, and arranged to utilize the power of the wind mill for pumping water in both light and strong winds.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in both the views.

Figure 1 is a side elevation of the improvement, parts being broken out, and Fig. 2 is an enlarged cross section of the same, on the line 2—2 of Fig. 1.

The rod A of the wind mill mounted on the tower B is pivotally connected at its lower end with the long end C′ of a walking beam C, fulcrumed on a suitable support D, as plainly illustrated in Fig. 1. The opposite end C² of the walking beam C is pivotally connected by a link E with the plunger rod F′ of a single acting pump F of any approved construction and usually employed for pumping water, and the like. On the long end C′ of the walking beam C is adjustably secured a counterweight G by the use of a set screw G′, to permit of shifting the counterweight G closer to or farther from the fulcrum of the walking beam. By the arrangement described the pump F is counterbalanced to permit of actuating the pump F in a very light wind, as less power on the part of the wind mill is required to lift the water in the said pump F.

It is understood that in ordinary wind mills employed for actuating a single acting pump, the wind mill is required to lift the entire column of water as well as the plunger rod and connected parts, and on the down stroke very little power is required on the part of the wind mill. Now in a very light wind, the wind mill is not capable of lifting the load, but with my improvement as described and shown, the work required of the wind mill in both the up and down strokes of the rod A is practically equalized, that is, less power is required on the part of the wind mill for lifting the water in the pump F, owing to the counterweight G on the long end C′ of the walking beam C.

In case a very strong wind is blowing then a second pump H is connected with the long end C′ of the walking beam C, and in this case the counterweight G is removed from the walking beam and dispensed with. The plunger rod H′ of the second pump H is connected by a link I with a bracket J fastened to the under side of the long end C′ of the walking beam C and directly below the connection of the wind mill rod A with the walking beam C. As the two pumps are connected now with the opposite ends of the walking beam C, it is evident that the power of the wind mill rod A is used to the full extent in both the up and down strokes. A guide K held on the tower B straddles the long end C′ of the walking beam C, to insure a proper up and down swinging motion of the walking beam.

The device is very simple and durable in construction, and can be readily connected with ordinary wind mills now in use.

If desired, the counterbalancing weight G may be placed on the other end of the walking beam C, or entirely omitted.

Having thus described my invention, I claim as new and desire to secure by Letters Patent:

A power transmission, comprising a walking beam having its ends different distances from the fulcrum, a pump connected with the short end of the walking beam, actuating means connected with the long end of the walking beam and a second pump arranged for removable connection with the long end of the walking beam, the said second pump being in axial alinement with the actuating means, and a counterweight slidably mounted on the long end of the walking beam whereby to compensate when the said second pump is removed from connection with the beam.

In testimony whereof I have signed my name to this specification in the presence of two subscribing witnesses.

DANIEL M. LE BARON.

Witnesses:
　LOYAL H. MCCARTHY,
　J. A. NELSON.